United States Patent
Per et al.

(10) Patent No.: US 7,831,789 B1
(45) Date of Patent: *Nov. 9, 2010

(54) METHOD AND SYSTEM FOR FAST INCREMENTAL BACKUP USING COMPARISON OF DESCRIPTORS

(75) Inventors: Yuri S. Per, Moscow (RU); Maxim V. Tsypliaev, Moscow (RU); Maxim V. Lyadvinsky, Moscow (RU); Alexander G. Tormasov, Moscow (RU); Serguei M. Beloussov, Singapore (SG)

(73) Assignee: Acronis Inc., Tortola (VG)

( * ) Notice: Subject to any disclaimer, the term of this patent is extended or adjusted under 35 U.S.C. 154(b) by 494 days.

This patent is subject to a terminal disclaimer.

(21) Appl. No.: 11/686,454

(22) Filed: Mar. 15, 2007

Related U.S. Application Data

(63) Continuation-in-part of application No. 11/244,298, filed on Oct. 6, 2005, now Pat. No. 7,366,859.

(51) Int. Cl.
*G06F 12/16* (2006.01)
(52) U.S. Cl. .................... 711/162; 707/625
(58) Field of Classification Search ............... 711/161, 711/162, 216; 707/624–625, 634, 639, 646, 707/745, 747, 999.202, 999.204
See application file for complete search history.

(56) References Cited

U.S. PATENT DOCUMENTS

| | | | | |
|---|---|---|---|---|
| 5,649,152 A | | 7/1997 | Ohran et al. | |
| 5,835,953 A | * | 11/1998 | Ohran | 711/162 |
| 6,625,623 B1 | * | 9/2003 | Midgley et al. | 707/204 |
| 6,665,815 B1 | | 12/2003 | Goldstein et al. | |
| 7,434,052 B1 | * | 10/2008 | Rump | 713/171 |
| 2006/0075294 A1 | * | 4/2006 | Ma et al. | 714/13 |

* cited by examiner

*Primary Examiner*—Brian R Peugh
*Assistant Examiner*—Nicholas Simonetti
(74) *Attorney, Agent, or Firm*—Bardmesser Law Group

(57) ABSTRACT

A method, system computer program product recorded on a computer readable medium, for fast incremental backup of a storage device includes selecting an area of the data storage device for backup; creating the bitmap of data storage device; reading the selected area of the data storage device; converting data read from the data storage device into a usable format for the comparison of descriptors; reading descriptors of logical storage units of the selected area; discarding selected data access attributes of the descriptors; generating hash values for the descriptors; comparing the hash values of the descriptors of the logical storage units of the selected area with the hash values of the descriptors of previously archived logical storage units; for physical storage units related to logical storage units of the selected area whose hash values of the descriptors are identical to the hash values of the descriptors of the archived logical storage units, checking if these physical storage units need to be backed up; updating the bitmap of data storage device; and backing up contents of the physical storage units marked in the backup. The logical storage units can be files. The descriptors can be compared on a physical storage unit basis.

31 Claims, 11 Drawing Sheets

METHOD AND SYSTEM FOR FAST INCREMENTAL BACKUP USING COMPARISON OF DESCRIPTORS

CROSS-REFERENCE TO RELATED APPLICATIONS

This application is a continuation-in-part of U.S. Pat. No. 7,366,859, which was U.S. patent application Ser. No. 11/244,298, filed Oct. 6, 2005, entitled FAST INCREMENTAL BACKUP METHOD AND SYSTEM, which is incorporated herein by reference in its entirety.

BACKGROUND OF THE INVENTION

1. Field of the Invention

The present invention relates to archiving and copying of data, and more particularly, to fast archiving of hard disk drive (HDD) data at various predetermined points in time by using comparison of descriptors.

2. Description of the Related Art

Currently, there are a number of conventional methods that relate to organization of data archiving. One of these methods is a backup of the entire hard drive, which typically involves copying of the hard drive content onto some other medium, such as another hard disk drive, a DVD ROM, a DVD RAM, a flash disk, etc. The primary disadvantage of such a method is the need to backup what is frequently a very large amount of data. On the one hand, this results in a relatively lengthy process of archiving, and, on the other hand, frequently requires relatively large available space for the archived data. This ultimately results in a relatively high cost of archiving per unit of archived data.

Another approach is often referred to as "incremental backup," which generally decreases the amount of space required for the archiving. With the incremental backup, typically the contents of the hard disk drive are archived, or stored somewhere, once. After that, only that data that has been changed, or added, since the previous backup, or since the pervious incremental backup, is actually archived. Recovery of the data from the archive typically involves merging of the original backup and the various incremental backups.

There are generally two conventional approaches to implementing the incremental backup. One approach is to archive data in a form of logical structures, such as files. The second approach is to preserve the physical structures as they are represented on a storage medium. In other words, in the second case, sectors, clusters, and other physical data blocks are archived.

Despite the fact that incremental backup at a logical level makes it easier to identify data that is subject to archiving, in a number of situations, this approach is unacceptable. For example, backup at a physical level provides an ability to restore the functionality of the computing system, since it is possible to restore hidden and otherwise unmovable data blocks, for example, hidden and system areas of the disk, including boot areas.

At the same time, incremental backup at a physical level requires identifying the blocks that are subject to archiving, in other words, identifying blocks whose content did not change since the prior archiving operation. When data block level comparison is used, this task requires a considerable time and CPU resources, both for data block comparison and for extraction of previously archived data blocks from the archive.

Accordingly, there is a need in the art for an effective and efficient method of identifying data blocks that are not subject to archiving, with minimal time and effort.

SUMMARY OF THE INVENTION

Accordingly, the present invention is related to a method and system for fast incremental backup using comparison of descriptors that substantially obviates one or more of the disadvantages of the related art.

In one aspect, there is provided a method for incremental backup of a storage device, including selecting an area of the data storage device for backup; creating the bitmap of data storage device; reading the selected area of the data storage device; converting data read from the data storage device into a usable format for the comparison of descriptors; reading descriptors of logical storage units of the selected area; discarding selected data access attributes of the descriptors; generating hash values for the descriptors; comparing the hash values of the descriptors of the logical storage units of the selected area with the hash values of the descriptors of previously archived logical storage units; for physical storage units related to logical storage units of the selected area whose hash values of the descriptors are identical to the hash values of the descriptors of the archived logical storage units, checking if these physical storage units need to be backed up; updating the bitmap of data storage device; and backing up contents of the physical storage units marked in the backup.

The logical storage units can be files. The comparison can be, e.g., (1) bit-wise comparison of the logical blocks, (2) comparing control sums of the logical blocks, and (3) comparing log files relating to the logical storage units. The physical storage units can be blocks. The descriptors can be, e.g., MFT entries, directory entries, directory entries and numbers of all clusters according to which the directory entries are ordered, inodes, hash function values, timestamps, checksums, and file metadata. The descriptors can be compared on a physical storage unit basis.

According to a proposed method, hashed or non-hashed files or directory attributes can be stored in an incremental backup for further comparison with hashed or non-hashed data access attributes upon completion of a next backup process or the attributes can be deleted upon creation or update of a bitmap.

The stored file or directory attributes (hashed or non-hashed), reflecting the changes or displacement of the file or the directory, are used for forming the backup and for restoring data from the backup. Also, the proposed method can optionally include generating a bitmap of the physical storage units of the storage device; marking, in the bitmap, those physical storage units that correspond to logical storage units with different descriptors; and archiving content of the physical storage units marked in the bitmap. The method can optionally include archiving logical storage units of the storage device having the same name as corresponding archived logical storage units of the storage device, but different time stamps.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Figure 1:
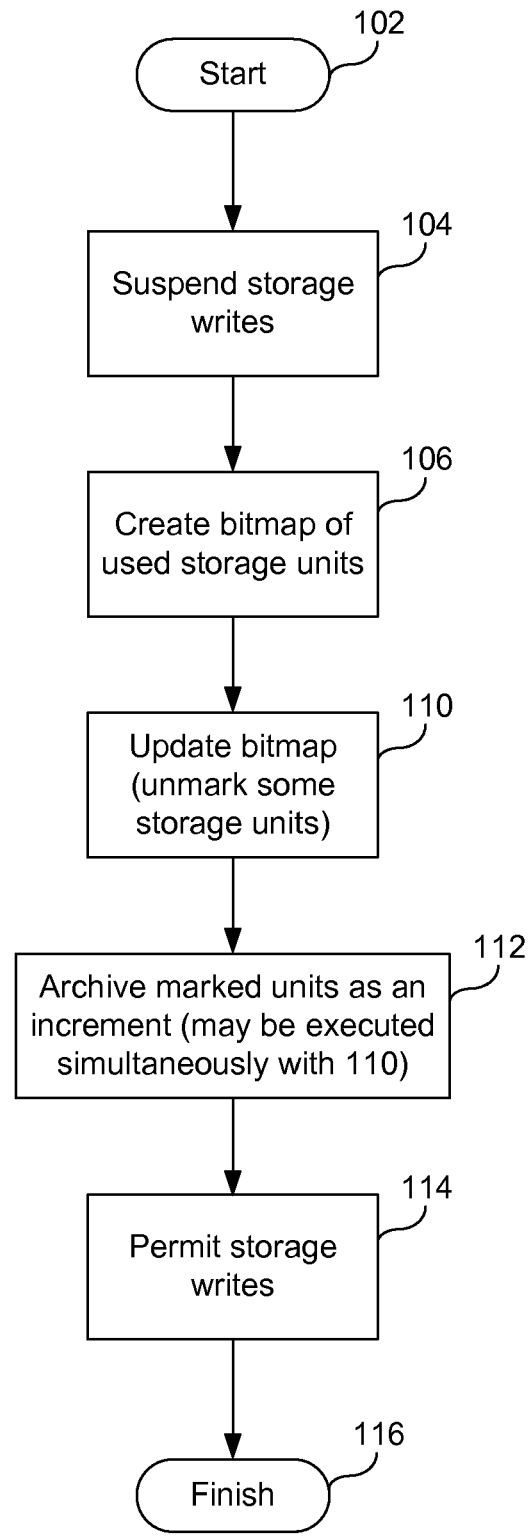
FIG. 1 illustrates one general exemplary method of the present invention.

Reference will now be made in detail to the embodiments of the present invention, examples of which are illustrated in the accompanying drawings.

In order to make the archiving process more efficient, it is proposed to form a backup of data being represented mostly at a physical level, and in addition, to use information that characterizes the logical structure of the data storage device, such as a hard disk drive. It should be noted that data representation at a physical level and also "physical storage units" used in context of this discussion mostly signify access level to the data being stored. For purposes of this discussion, "physical storage units" specify parts (normally equal sized) of the physical or logical volume storage, the volume (hard disk drive or its part or even flash drive or network storage area or the like) is divided into, and which can be accessed at random by the operating system. Such a physical storage unit may be block or cluster or sector or similar structures used by the OS when accessing the volume.

It should be noted that this approach, in some cases, does not always identify every single data block that is not subject to archiving. However, the proposed method, with a minimal expenditure of time and resources, provides for a guaranteed exclusion of a substantial majority of the blocks from archiving of those blocks that do not need to be archived. Subsequently, for the blocks, that were not excluded from archiving, and are therefore subject to archiving, it is possible to use traditional methods and other suggested mechanisms to further reduce the number of data blocks that are actually subject to archiving.

In order to implement the proposed methods, the following steps are utilized:

First, at a physical level, a complete (or partial) backup of the storage medium is formed, and a time stamp of the backup is recorded (although it is also possible to work without a time stamp, by using other descriptors, such as hash functions, discussed below, file metadata, file names, MFT contents, inodes, directory entries, etc.). When a second archiving operation is performed, a bitmap of the data blocks of the hard disk drive is formed. For example, this can be a bitmap of the data blocks that are subject to archiving, or the bitmap of used data blocks of the hard disk drive (i.e., the blocks of the hard disk drive that contain useful data, rather than "empty" blocks, or free blocks).

During subsequent archiving of the hard disk drive, a comparison of the descriptors of the logical structures of the drives is performed. This comparison characterizes the distribution of the data of the logical structures into the data blocks. If the logical structures (including the addresses of the blocks) correspond to each other, the data blocks that are occupied by the corresponding logical structures are identified, and for these blocks, the corresponding bit in the bitmap is cleared.

At the same time, it is also possible to retain, in the incremental backups, those blocks that were previously archived. However, a substantial increase in the speed of identifying the blocks that do not need to be archived compensates for this. If it is necessary to reduce the downtime of the computing system or server, the advantages of the above approach are fairly substantial. In other words, comparing the time needed for a full backup with the time necessary for a bit-wise comparison of the data block's content (given the necessity of unarchiving of the contents of one or more copies of the data, and the time necessary to implement a single backup in the proposed approach), the advantages of the proposed approach are self-evident.

The logs or change journal entries can be used to at least partially exclude various logical structures from the analysis. In other words, the fact that journal entries exist in the logs means that some changes have been made to the data in the blocks or files, and, therefore, they do need to be backed up without further checks. Thus, those physical storage units may be excluded from the selected area, or may be included in the selected area if only some blocks of those files may be modified.

A file system such as NTFS creates a Master File Table (MFT) and an associated log file that records file transaction information and implements file system recoverability. Because the log file is a system file, it can be found early in the boot process and used to recover the disk volume, if necessary. When a user updates a file, the Log File Service records all metadata "redo" and "undo" information for the transaction. For recoverability, "redo" information in the log file allows NTFS to roll the transaction forward (repeat the transaction if necessary), and "undo" allows NTFS to roll the transaction back, if an error occurs.

The infinite log file is a circularly reused file. When a new record is added, it is appended to the end of the file. When the log file reaches its capacity, the Log File Service waits for writes to occur and frees up space for the new entries.

As may be seen from the above discussion, the log file retains descriptions of only the latest transactions. Thus, the log file can only be used as an auxiliary source of information, since it does not provide a guarantee of a consistent backup.

Following that logic, by using the bitmap, it is possible to archive the marked blocks, in addition to a previously created archive.

Due to the fact that the final descriptors are also a subject to archiving, the modification of the bitmap and the archiving can take place simultaneously. For example, it is possible to archive MFT blocks simultaneously with verification of identity of the file structures of the archived blocks. Identical blocks of the original MFT and the current MFT are not archived. At the same time, in some cases, the identity of the blocks frequently is due to the identity of the corresponding files, although this is not guaranteed.

For files with distributed blocks, for example, in logical structures described by FAT16 and FAT32, the proposed method of backup organization also permits to considerably shorten the time necessary for checking of data blocks of the files. This is due to the fact that some of the files are excluded from this process, without any further need for subsequent checking of data block identity. In some cases, when the data block address is changed (for example, due to defragmentation process), it is possible to also change the address of the original cluster, as well as of the subsequent clusters. If this is done, no subsequent checking of the data blocks needs to be performed. Thus, the volume of computation necessary for the archiving is reduced significantly, compared to a block by block comparison of the contents of the hard disk drive.

In some cases, it is possible to use a comparison of used blocks bitmap with current and previously stored states of the hard disk drive. In this case, blocks that were previously free are excluded from consideration, and are archived without any further examination of the contents of the data blocks.

In another case, the descriptors of the logical structures can be compared not directly, but through a creation of additional data structures, and subsequent comparison of such data structures. For example, when forming a snapshot of logical structure descriptors, it is possible to convert them by using various control sum functions, for example, cyclic redundancy check (CRC) functions or hash functions. Hash functions are one example of algorithms that transform a string of bytes into a (usually) shorter value of a fixed length that represents the original string.

This short value is called a hash value. When hashing a data block, or a file, the content is converted into a short bit string—a hash value. In this case coincident data blocks always result in coincident hash values. Therefore, only the hash values can be saved, and can be stored together with, or added to, the backup. This allows avoiding hashing a data block, or a file, whose content is converted into a hash value, and the hash value can be used in creating the new incremental backup, with the already-calculated hash values for their comparison.

In the proposed embodiment the two types of hash values are created for each file at once: short and long hash values. Note, that only short hash values can be created, or only long hash values for each file. For example in MD5 algorithm the short hash values have 32 bits and the long hash values have 64 bits. The short hash value is calculated sufficiently fast, but there is a small probability of the hash values coincidences for different data from the data storage device. Thus, it is necessary to perform some additional checking to reduce the probability of error caused by coincident. Note that the longer hash value reduces the probability of the hash values coincidences for different data from the data storage device.

Calculation of the long hash values takes longer, but the probability of error is significantly lower. In this embodiment, data access attributes are discarded or replaced by nulls while conversion of descriptors of the logical structures to hash values takes place.

The term "data access attributes" used herein refers to any part of logical storage units of the selected area of the storage device intended for a backup, which is only changing after the access to the file or directory. These data access attributes can be changed, for example, while reading the file, and do not reflect the actual file changes, so these attributes is not reflect necessity of this file's backup. All other attributes can be hashed. In most cases, those attributes should be saved for further restoration.

Throughout the implementation of the proposed method, some data access attributes can change during file accessing, and they may not reflect any of the actual file changes. Data access attributes can be, for example, such attributes as Data Access Time, Time Read in MFT, data access date in directory entries of operating systems with FAT, and others as described above and will be described below.

In order to determine the identity of the logical structures, the hash values of the descriptors can be compared, as well as the hash values of the descriptors of the current state of the hard disk drive. Also, in one embodiment, bit-wise comparison of the hash values can be performed.

Depending on the length of the key that is generated by the hash operation, some other mechanisms may be added to verify blocks that should or should not be subject to archiving.

In fact, relatively short hash values may be generated and compared fairly rapidly. If hash values being compared are different, it shows that the original contents are also different. However, using a short hash key results in a higher probability that different contents have the same hash value. For example, if maximum hash value is less then number of different data blocks (here, groups of physical storage units), the different data blocks can have the same hash value. Therefore, when a possibility of omitting data required for archiving needs to be reduced to zero, additional operation of comparing blocks with the same hash values need to be implemented to prove that the data blocks at issue really are the same.

If the hash key length is relatively long, it gives an acceptable guarantee that the data blocks with the same hash values are in fact the same, e.g., the MD5 function gives about $10^{37}$ different keys, and no additional comparison of the data blocks with the same hash values is required. In this case, however, physical storage units from data blocks with different hash values need to be compared to exclude additional storage units from archiving, e.g., for saving archiving storage space.

The advantages of using hash value comparison are as following: first, it speeds up the comparison process, since the value of the hash of the data is much less in size than the data itself, and, second it permits simplification of comparison of fragmented data. In disk drive terminology, "structure(s)" can be used that emulates a tree structure with a set of linked nodes. Each node has zero or more child nodes, which are located below it in the tree. A node that has a child is called the parent node. A child has at most one parent; a node without a parent is called the root node (or "root"). Usually a placeholder for storing root information concerning the file is fixed in length.

In such cases, when the file descriptor has more bytes than the placeholder can hold, links or pointers to blocks that contain additional information are used. Such structures (leaf nodes) can be physically stored away from the root node, can be fragmented or can be changed without modifying the contents of the file, e.g., while changing long file name only. For example, descriptors of files (e.g., inodes), which can have links to indirect blocks and remote inodes, are hashed together with the indirect blocks. This arrangement permits a rapid comparison of the hash values and also permits grouping of fragmented data sets.

In one example, for structures described in FAT16 and FAT32 with a possibility of file fragmentation, a significant characteristic of their logical structure description is not only the file length and the address of the first data block, but also the location of all the blocks of the file. This information can be extracted sequentially for all the blocks of the file, and hashed together with the hashing of the FAT. This approach can also be used in NTFS, to verify B-trees.

To implement the proposed method, it is possible to use various approaches that suspend data storage device operations during the time that the archive is being formed. Single threaded run mode or single threaded data storage device access can be used. This can be accomplished by an operating system that maintains a single-threaded environment or by one that provides file system locking, and hence allows exclusive access. For example, the MS-DOS operating system provides exclusive file access because it is a single-threaded environment, at least from an application's perspective.

A Linux (or another UNIX-like) operating system can be used, utilizing system locks to provide exclusive access. While the Windows™ operating systems are multi-threaded, they can defer to MS-DOS, Linux or another single-threaded environment. An archiving program according to the embodiment can begin execution in these multi-threaded environments, and then can pass control to a code that runs in DOS or Linux mode and thus provide exclusive data storage device access. Some operating systems also provide locks that ensure exclusive data storage device access.

Also, when practicing the proposed method described above, the freezing, or suspension, of data storage device access can be replaced with other mechanisms for preserving the contents of the data storage device at the moment when the backup process begins. For example, it is possible to create an additional data structure that includes the contents of the data blocks as described in pending application Ser. No. 11/016,727, entitled System and Method for Incremental Backup of Local Drive Data, filed on Dec. 21, 2004, which is incorporated herein by reference in its entirety. Subsequently, this structure can be used as a part of the incremental backup, or, alternatively, the contents of the data blocks can be moved into an incremental backup after checking for necessity of archiving these blocks.

As yet another alternative, data that is subject to being written to the data storage device can be stored in some temporary data storage, with subsequent copying to the data storage device, once the formation of the incremental backup is completed.

From the perspective of the method described above, it is not critical exactly how files are organized into a logical structure, since the primary concern is how the file is described, rather than its location in the logical hierarchy. In other words, to establish identity of descriptors, it is possible to merely compare relevant file attributes. For instance, it is possible to compare the dates of changes to file contents, and ignore the dates of renaming of files, if the operating system permits this. Also, for files stored on a data storage device, it is possible to examine hash value functions of the file contents (e.g., using MD 5 and SHA-1 algorithms, which employ two commonly used hash functions) and in the future, these values can be used for a preliminary analysis after identity is established based on file hashes and file descriptions. A more detailed comparison can then be made.

Note that the proposed method is particularly applicable to file systems with contiguously arranged data blocks, for example, NTFS. Since the file descriptors are used in formation of the backup, upon user request, some of the files can be excluded from the archiving process. Examples of data that may not be subject to backup include various swap and paging structures, temporary files, and various other files, as identified by the user.

If identity is not determined, it is possible to perform an additional check as to the reasons for why identity is not established. For example, if the file contains additional characteristics or metadata, which results not in a change in contents, but in addition of other blocks to the file or, more commonly, to the file descriptor, (for example, the appearance of new data streams), the bitmap needs only to reset the bits that correspond to newer blocks of the file. As another example, additions can be performed, and if no identity of the contents exists, the corresponding blocks are always archived. As another example, additions can be performed, and if no identity of the contents exists, the corresponding blocks are always archived.

Additionally, to avoid the necessity of copying of identical data blocks into the incremental backup, it is possible to have a second step in the verification of identity of the blocks. In this secondary verification, the contents of the blocks that were previously identified as not subject to archiving are compared. At the same time, the contents of the blocks that were identified in a log file need not be checked for whether they need to be archived.

In the case of the second step discussed above, blocks and/or clusters are grouped in some predetermined manner, and for these grouped blocks, hashes are generated, which are then compared. If the hashes are identical, the corresponding blocks are marked as not subject to archiving. If the hashes are not identical, additional verification checks of some of the blocks can be performed, for example, on a cluster by cluster basis.

The proposed method can also be used with generic file systems, such as ReiserFS, ext3, XFS, JFS and XenFS. Note that when a file is being moved form one folder to another, which only affects the entry in the MFT, the backup of the data need not be made, but only the MFT needs to be backed up along with the corresponding entries and descriptors of the file.

Since the MFT is approximately 10% of the data storage device or a partition, the volume of the data that is being compared or restored from a prior backup is significantly less compared to the entire drive. Only those blocks whose data has not been changed are not backed up. Therefore, some of the blocks in the incremental backup may be "extra."

FIG. 1 illustrates one exemplary method of the present invention. As shown in FIG. 1, after starting the archiving process (step 102), storage writes are suspended (step 104). A bitmap of used storage units (i.e., blocks or clusters or sectors) is created (step 106). In step 110, the bitmap is updated by unmarking some of the storage units that are not subject of incremental backup. Such storage units are, for example, physical blocks or clusters of storage device related to logical storage units with coincident descriptors.

Also, other mechanisms of identifying physical storage units that should not be subject to archiving may be implemented, as discussed below. In step 112, units that are marked are archived as part of the incremental backup. This step may be executed simultaneously with step 110. In step 114, storage writes are again permitted, and the process finishes in step 116.

Figure 2:
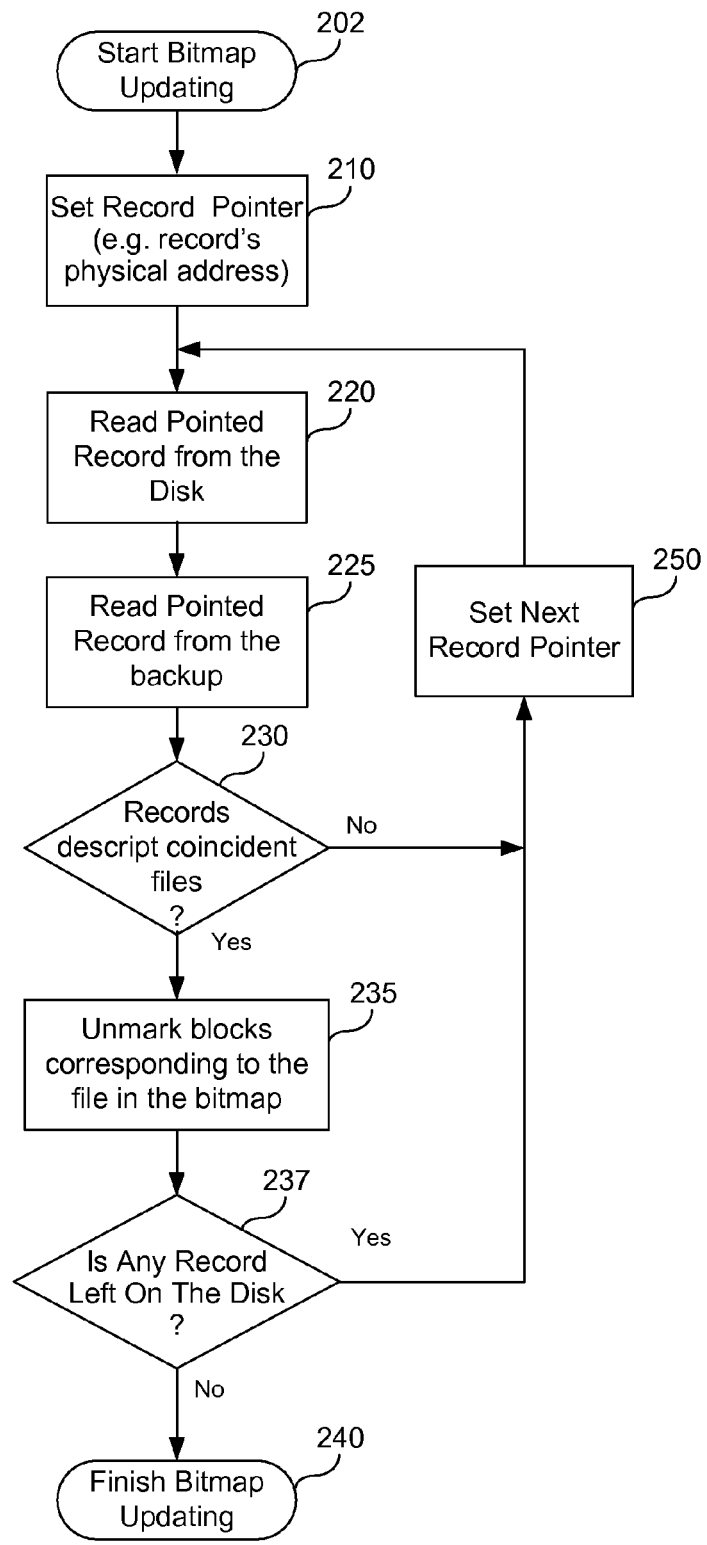
FIG. 2 illustrates identification of physical storage units that should not be subject of incremental backup.

FIG. 2 illustrates identification of physical storage units that should not be subject to incremental backup being described in a particular implementation of bitmap updating algorithm shown in FIG. 1 as step 110. In step 202, the bitmap updating process begins. It should be noted that the steps in FIG. 2 are described using records as examples. Such records store information that characterizes logical storage units. Examples of records can be physical storage blocks, or parts of MFT file that contains descriptors of files, or inodes, or other similar data objects.

Commonly, descriptors of files are stored in the designated data storage device area, and logical descriptors are stored in the same blocks, if the descriptor is not changed. In this case, the simplest way of comparing descriptors is comparing records, represented by the physical storage blocks of the designated area. The task of counting records involves, for example, consecutively incrementing designated block addresses and comparing contents of the blocks with the same addresses that have been read from the storage device vs. those extracted from the previous backup structure. A direct comparison of corresponding blocks' content may be replaced by comparing hash values, calculated for those blocks, or by any other appropriate method.

In step 210, the record pointer (e.g., address of an initial storage block) is set, in other words, the records physical address is identified. In step 220, the record, to which the pointer points to, is read from the data storage device or from the snapshot of the data storage device. In step 225, the record, to which the pointer points to, is read from the backup. Note that processes 220 and 225 can occur in parallel to each other. In step 230, comparing of descriptors of logical storage units is provided. The descriptors can be compared entirely or partially (for example, only file names, time stamps of file modification and physical addresses of files' clusters can be compared).

In another embodiment, a procedure for comparing descriptors or portions of descriptors may be implemented by calculating hash values for the descriptors or their parts and comparing calculated hash values. For handling of large data sets, further comparing of data itself required since equal hashes may be generated for different sets of data. If the answer is yes, i.e. descriptors are coincident, then in step 235 physical storage units of the logical storage units are unmarked in the bitmap, and further are not considered as a subject to incremental backup. If the answer is no, i.e. descriptor of logical storage unit had been changed since previous backup, then the corresponding physical storage units can be subjected to the incremental backup.

Then the process goes to step 237 to check if there are logical storage units being unexamined. If there are unexamined logical storage units, the next record pointer is set in step 250, and the process then proceeds back to step 220. If all the logical storage units from the selected area are examined, bit map updating is finished (step 240).

Some physical storage units outside the selected area may be archived without additional checking. Such units may be blocks or clusters of the MFT, blocks with partition information, blocks of files indicated in the log file described above, etc.

Additionally, it should be noted that after a defragmentation of the hard drive (or some other movement or relocation of the data blocks that does not affect their contents), the descriptors are changed to ensure that the new location of the data block is properly reflected in the corresponding descriptors and/or the bitmap. Therefore, movement of blocks may be properly analyzed during the update of the bitmap even if content of the file itself does not change.

Figure 3:
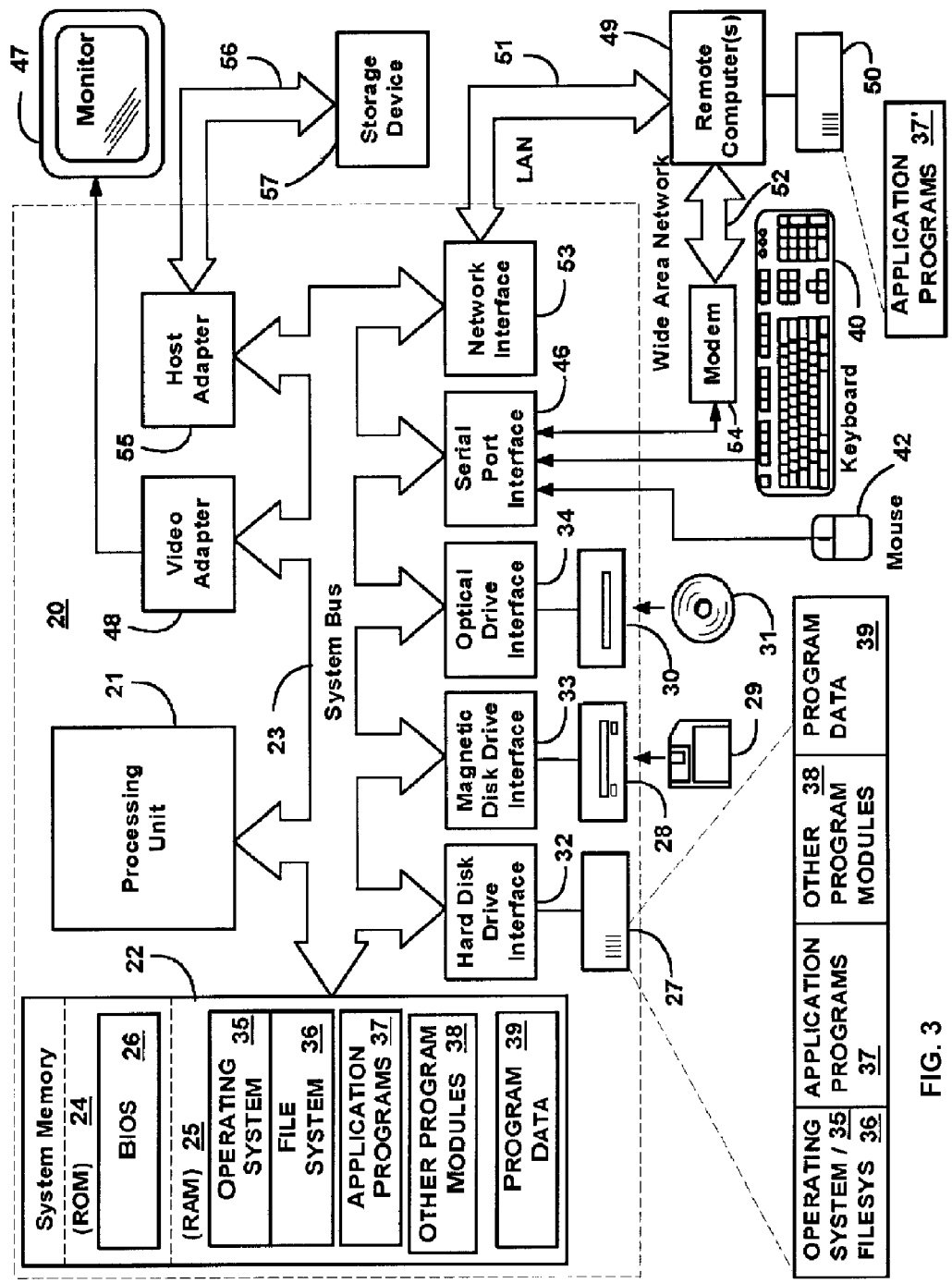
FIG. 3 is a schematic diagram of an exemplary computer or server that can be used in the invention.

With reference to FIG. 3, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. A data storage device 57, such as a hard disk drive, a magnetic tape, or other type of storage device is also connected to the system bus 23 via an interface, such as a host adapter 55 via a connection interface 56, such as Integrated Drive Electronics (IDE), Advanced Technology Attachment (ATA), Ultra ATA, Small Computer System Interface (SCSI), SATA, Serial SCSI and the like.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20. may further include a memory storage device 50. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 4:
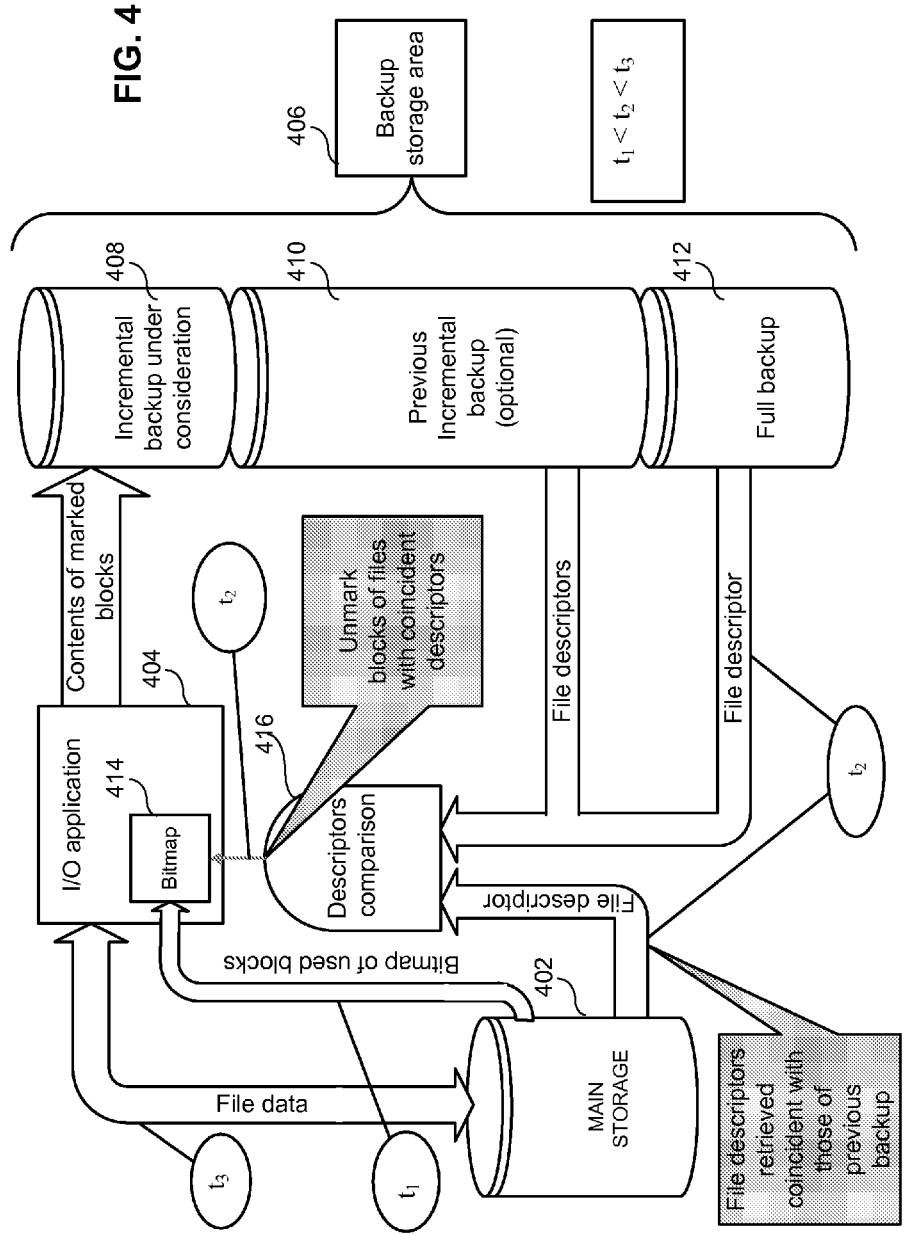
FIG. 4 is a schematic diagram of storage structures handling according to one embodiment of the invention.

FIG. 4 illustrates a system block diagram of one embodiment. As shown in FIG. 4, a main storage 402 interfaces with an I/O application 404 for the purpose of backing up file data. The I/O application 404 maintains a bitmap 414, as discussed above, which keeps track of selected area of the data storage device, e.g. used blocks (i.e., blocks that contain useful data), or blocks of logical units that area not reflected in a log of changes. The latter may stay out of consideration, since it should be backed up any way.

A backed up data storage area 406 consists of at least a full backup 412 of data storage device, a previous incremental backup 410, and the backup currently under consideration (408), based on the contents of the marked blocks. At time $t_1$ the bitmap is maintained based on the state of the main storage 402 then, at time $t_2$ the descriptors are compared (416) and after updating bitmap, at time $t_3$ content of marked physical storage units is transferred to incremental backup storage 408.

Figure 5:
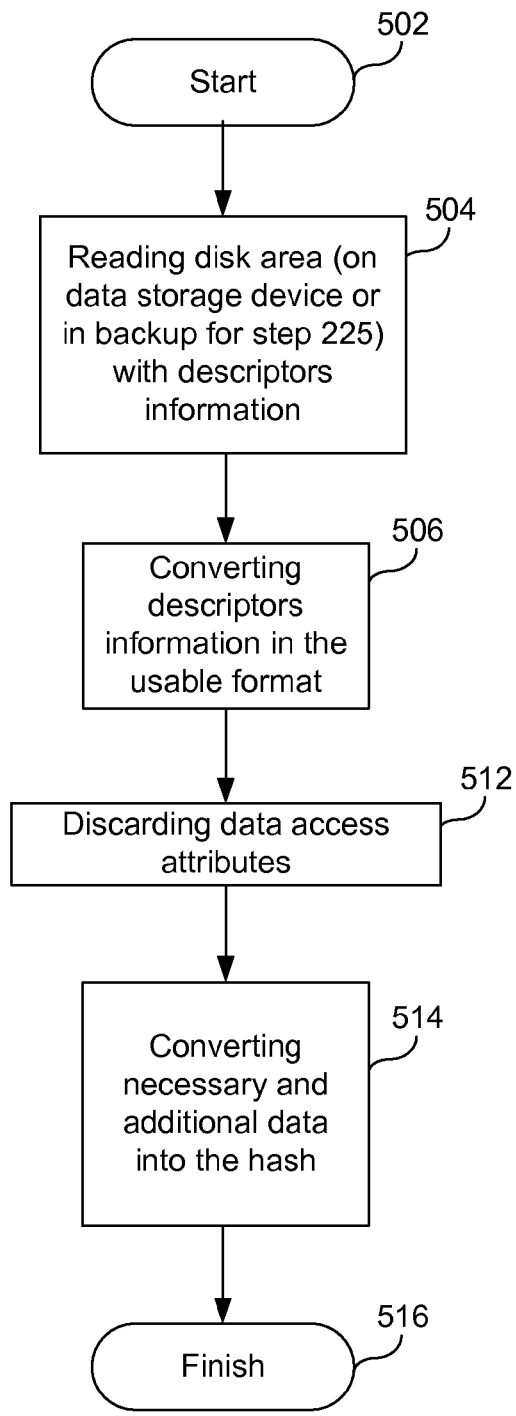
FIG. 5 illustrates a process of reading and converting descriptors from the data storage device.

FIG. 5 illustrates a process of reading and converting descriptors from the data storage device (or from the snapshot of the data storage device) or from the backup. As shown in FIG. 5, after setting a record pointer the process of reading and converting a pointed record from the data storage device (or from the snapshot of the data storage device) or from the backup is started (step 502). After step 502 the descriptors' information is read from a data storage device area (step 504).

The file system contains the file attributes. The file attributes have a special section containing the descriptors' information. The file attributes for each file system are different. For example, in NTFS file system the file attributes are located in the header of file record in a form of $data (data, that contains file data), $attribute_list (lists the location of all the attribute records that do not fit in the MFT record), $file_name (a repeatable attribute for both long and short file names), $object_ID (a volume-unique file identifier, used by the link tracking service) and other records in file record.

For FAT file system the file attributes are DOS file name, file attributes, create time, last access time, EA-index, last modified data, last modified time, file size and other records in the directory table of FAT element.

For Ext2/Ext3 file system the file attributes are header of inode, owner, access time, last modified, size and other records in inode of the inode table. The descriptors' information is stored on the storage device in its own format with information needed for its processing.

All of the data unnecessary for the process of descriptors' comparison needs to be eliminated. In step 506 the data without the file information is discarded. After the descriptors' information is converted, the unnecessary data access attributes can be discarded, e.g. reset, erased, nulled or replaced by constant or predefined values, because some data access attributes can be changed, for example, while reading the file, and do not reflect the actual file changes, as was described above.

Also in case of file system, such as FAT, FAT16, FAT32 and others, directory represented as file can have changing attributes, which do not mean anything in terms of a backup process. For example, a simple action of file allocation in directory structure can change the attributes. The discarded data access attributes can be completely discarded while hashing takes place. However, the date related to file allocation should be backed up.

In step 512 the data access attributes are discarded. In step 514 prepared data is converted into the hash value and the process is finished in step 516. Note that the data access attributes can be discarded completely while the hashing process is going on. After the data from the data storage device (or from the snapshot of the data storage device) and the data from the backup are converted into hash values they can be compared.

After converting data from disk areas on data storage device (or in the snapshot of the data storage device) and optionally from the backup into hash values, they can be compared. The comparison, in another embodiment, may be performed in parallel with the hash calculation, and hash values calculated for backed up structures may be stored separately or as a part of backup after an earlier backup, and then used for comparison.

Figure 6:
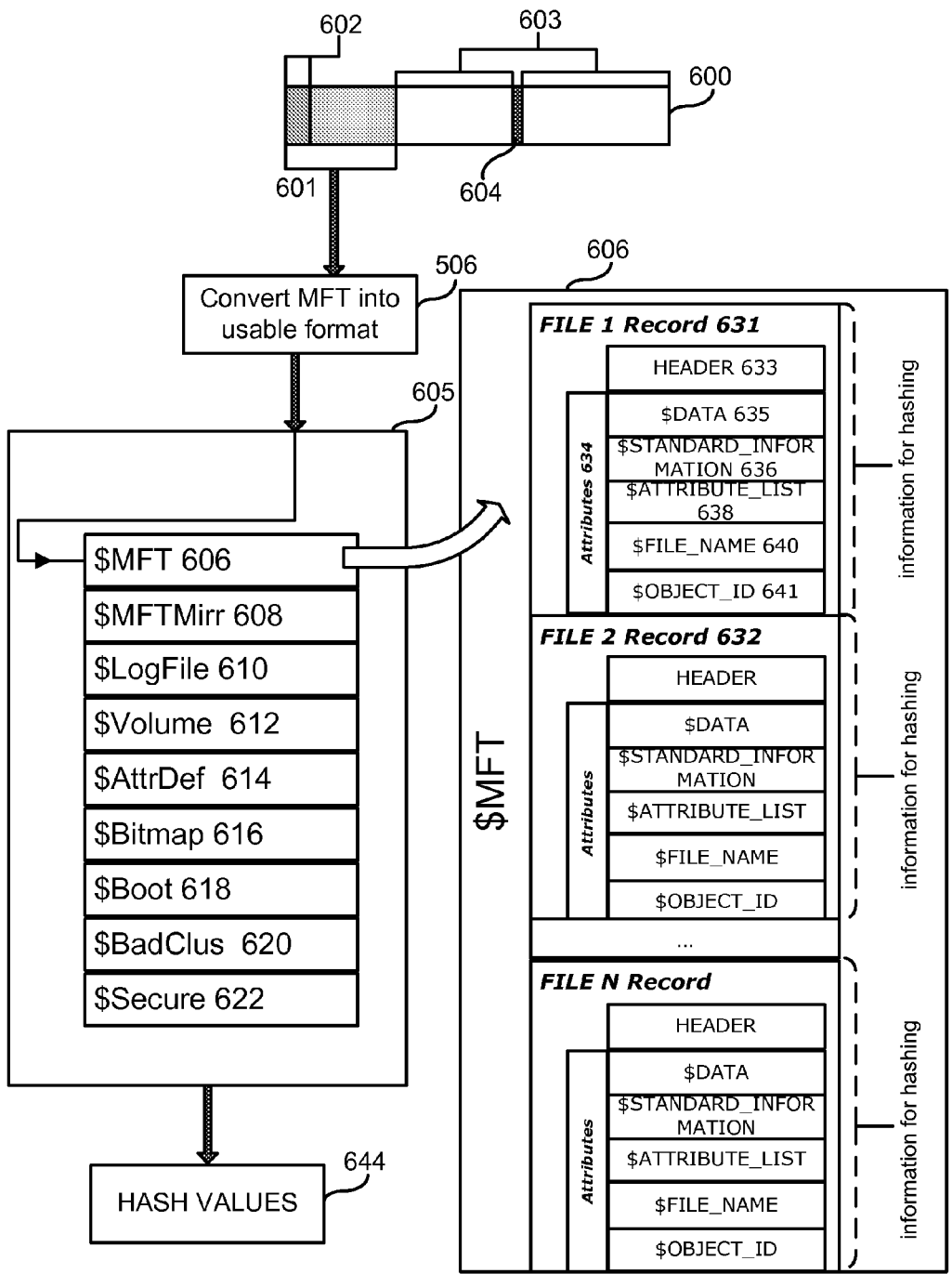
FIG. 6 illustrates a process of hashing the descriptors from a data storage device with NTFS file system.

FIG. 6 illustrates a process of hashing the descriptors from the data storage device with NTFS file system. The record, to which the pointer points to, is read from the disk. The disk storage within NTFS 600 includes the MFT-zone 601, places for files 603 and the first records copy 604. After starting the process of reading pointed record from the disk it is necessary to read the disk area within the MFT-zone. The MFT-zone consists of metafiles 602, such as $MFT (master file table, that contains one base file record for each file and directory on an NTFS volume) 606, $MFTMirr (master file table 2—a duplicate image of the first four records of the MFT, that guarantees access to the MFT in case of a single-sector failure) 608, $LogFile (journaling support file, that contains a list of transaction steps used for NTFS recoverability) 610, $Volume (housekeeping information—volume label, file system version, etc.) 612, $AttrDef (list of standard files attributes on the volume) 614, $Bitmap (volume free space bitmap) 616, $Boot (boot sector, that includes the bootstrap for the volume if it is a bootable volume) 618, $BadClus (bad cluster file, that contains bad clusters for the volume) 620, $Secure (security file, that contains unique security descriptors for all files within a volume) 622 and others.

Only $MFT-file 606 contains the descriptors' information necessary for this embodiment. Note that $MFT-file is stored on the data storage in its own data format with the information necessary for processing. In step 506 the $MFT-file is converted to the original form 605.

After $MFT-file has been presented in the original form the data access attributes are discarded. $MFT-file consists of file records 631, 632 etc., corresponding to the files on the disk storage. The file record consists of a header 633 and attributes 634. The attributes consist of $DATA (data, that contains file data) 635, $STANDARD_INFORMATION (standard information, that includes information such as time stamp and link count) 636, $ATTRIBUTE_LIST (lists the location of all the attribute records that do not fit in the MFT record) 638, $FILE_NAME (a repeatable attribute for both long and short file names) 640, $OBJECT_ID (a volume-unique file identifier, used by the link tracking service) 641 and etc.

In case of the NTFS-system the data access attributes are the update sequence in header 633 and Time Read (not shown) in $STANDARD_INFORMATION (636). Only the data access attributes described above can be discarded. However, any other attributes can change during just reading of the file and do not reflect any of the actual file changes.

File record contents from start of file record to the end marker (i.e. all data with the exception of the unused area of MFT entries) and extra file-records (if any exist) is converted to a hash value 644 after the data access attributes are discarded. Thus, the hash values are reduced. Therefore, the time needed for making comparison of the hash values from the backup and from the file record contents on data storage area is significantly reduced.

In some cases a number of the same file records can exist for one file. These file records are called extra file records (except for the first file record). In case of existence of extra file records, after the data access attributes are discarded, $MFT contents from start of file record to the end marker are converted to a hash value and are written additionally to the end of the created hash string according to the file record priority (i.e. first file record, second and etc.).

Figure 7:
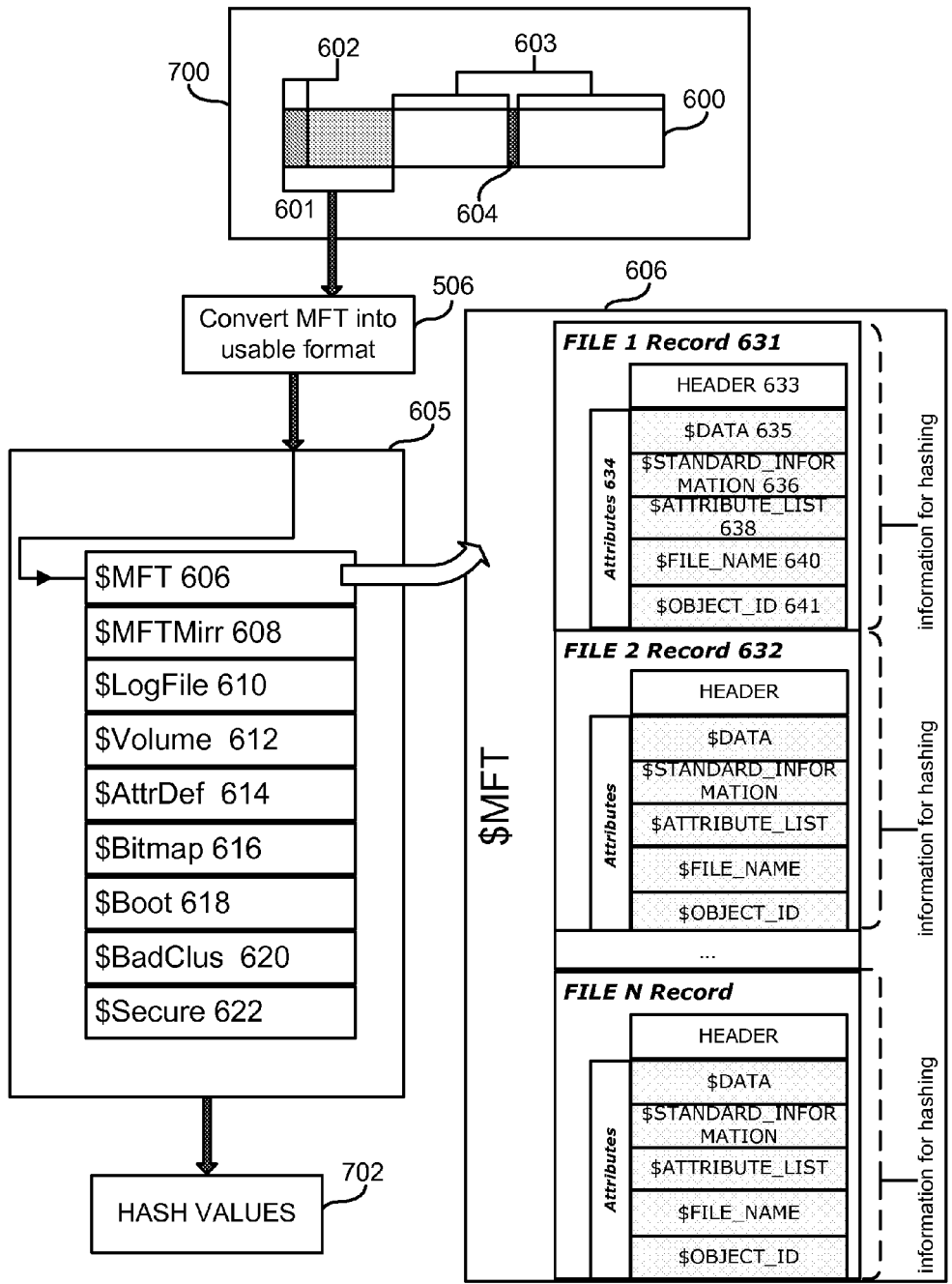
FIG. 7 illustrates a process of hashing the descriptors from the backup of the data storage device with NTFS file system.

FIG. 7 illustrates a process of hashing the descriptors from the backup of the data storage device with NTFS file system. In case of reading descriptors from the backup 700, previously stored data from the data storage device with NTFS 600 is included in the backup. The stored data storage device area can be read through from the backup in NTFS structure.

After hash values 702 are acquired, the operation of comparing descriptors or portions of descriptors' implemented by calculating hash values for the descriptors or portions of the descriptors', can be started.

Figure 8:
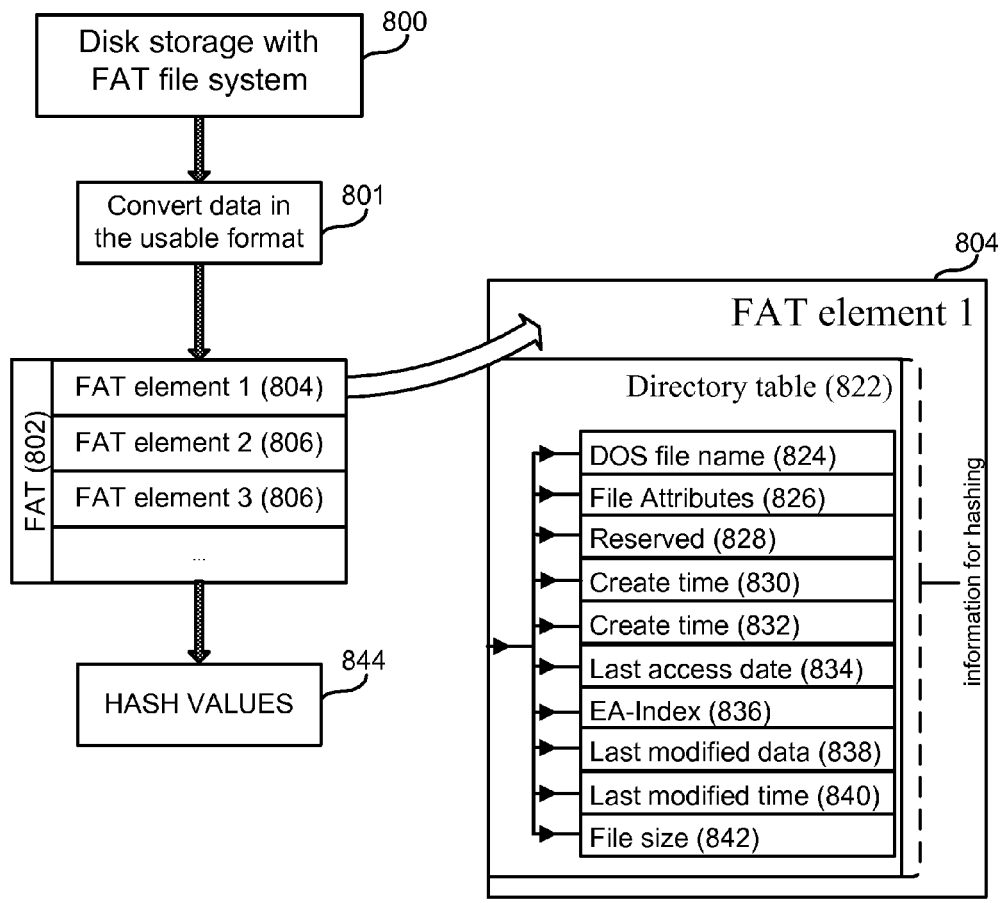
FIG. 8 illustrates a process of hashing the descriptors from a data storage device with FAT file system.

FIG. 8 illustrates a process of hashing the descriptors from the data storage device with FAT file system. The data storage device with FAT file system (800) contains necessary elements for processing files. After starting the process of reading pointed records from the data storage device it is necessary to read the data storage device area with the File Allocation Table (FAT) 802.

The FAT is stored on the data storage in its own format with the information necessary for processing. In step 801 FAT is converted to the original form 802. After FAT has been presented in the original form the data access attributes are discarded. FAT consists of FAT elements 804, 806, etc., corresponding to clusters on the data storage device. The FAT elements consist of directory table 822.

Each entry of the directory table has a record for every file, that consist of: DOS file name 824, file attributes 826, reserved area 828, create time 830, create time 832, last access date 834, EA-Index 836, last modified data 838, last modified time 840 and file size 842. Each file or directory stored is represented by a 32-byte entry in the directory table. In this embodiment the common FAT records are converted into records for each file.

Further directory entries and block numbers for this directory, except number of first block, are converted into a hash value 844 after the data access attributes are discarded. Also, the directory entries for the files and block numbers for this file, except number of first block, are converted into hash values 844 after the data access attributes are discarded.

Figure 9:
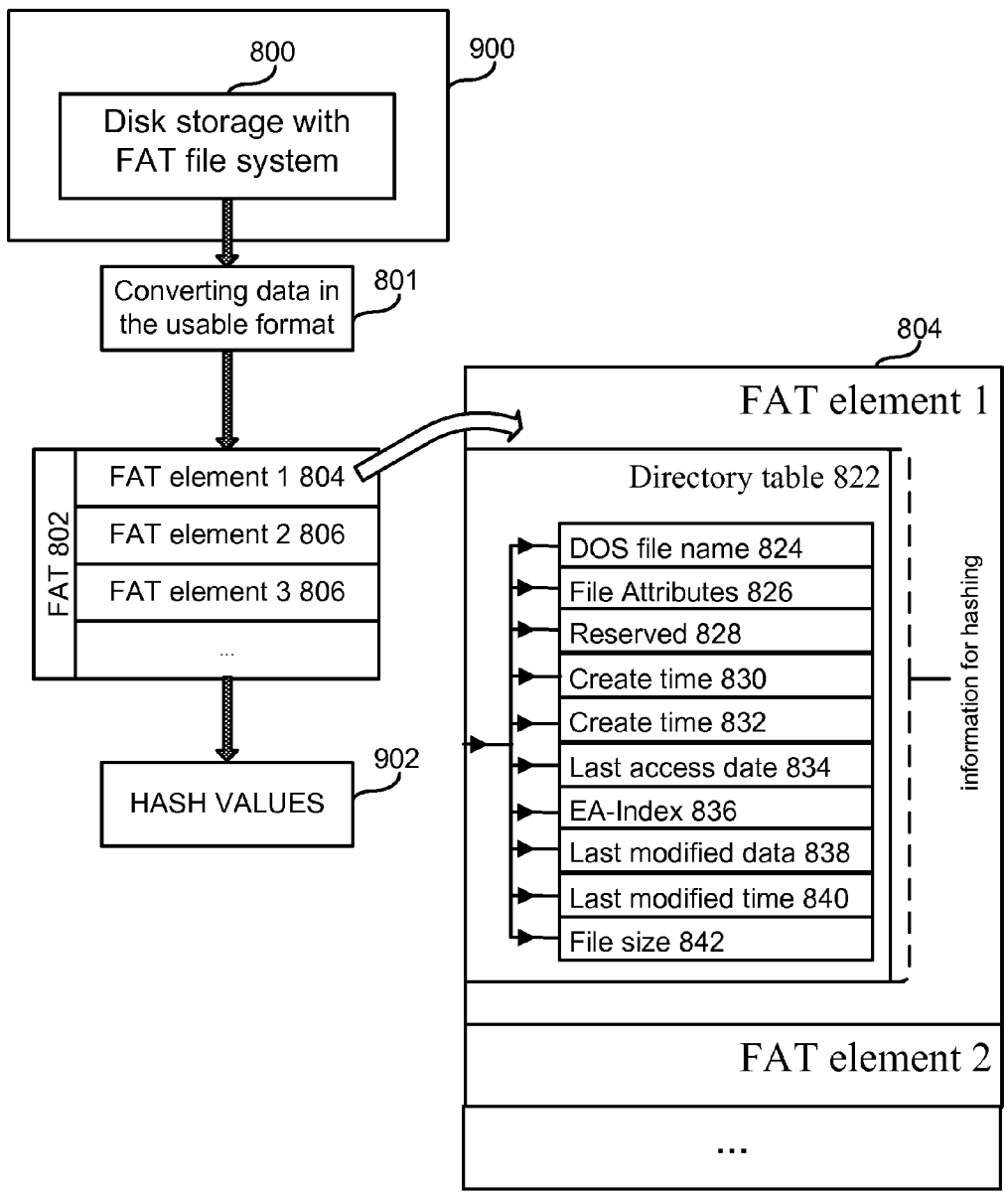
FIG. 9 illustrates a process of hashing the descriptors from the backup of a data storage device with FAT file system.

FIG. 9 illustrates a process of hashing the descriptors from the backup of the data storage device with FAT file system. In case of reading descriptors from the backup 900, the previously stored data from the data storage device with FAT 800 is included in the backup. The data storage device stored area can be read through from the backup in FAT structure.

After hash values 902 are acquired the operation of comparing descriptors or portions of the descriptors implemented by calculating hash values for the descriptors or parts of the descriptors can be started.

Figure 10:
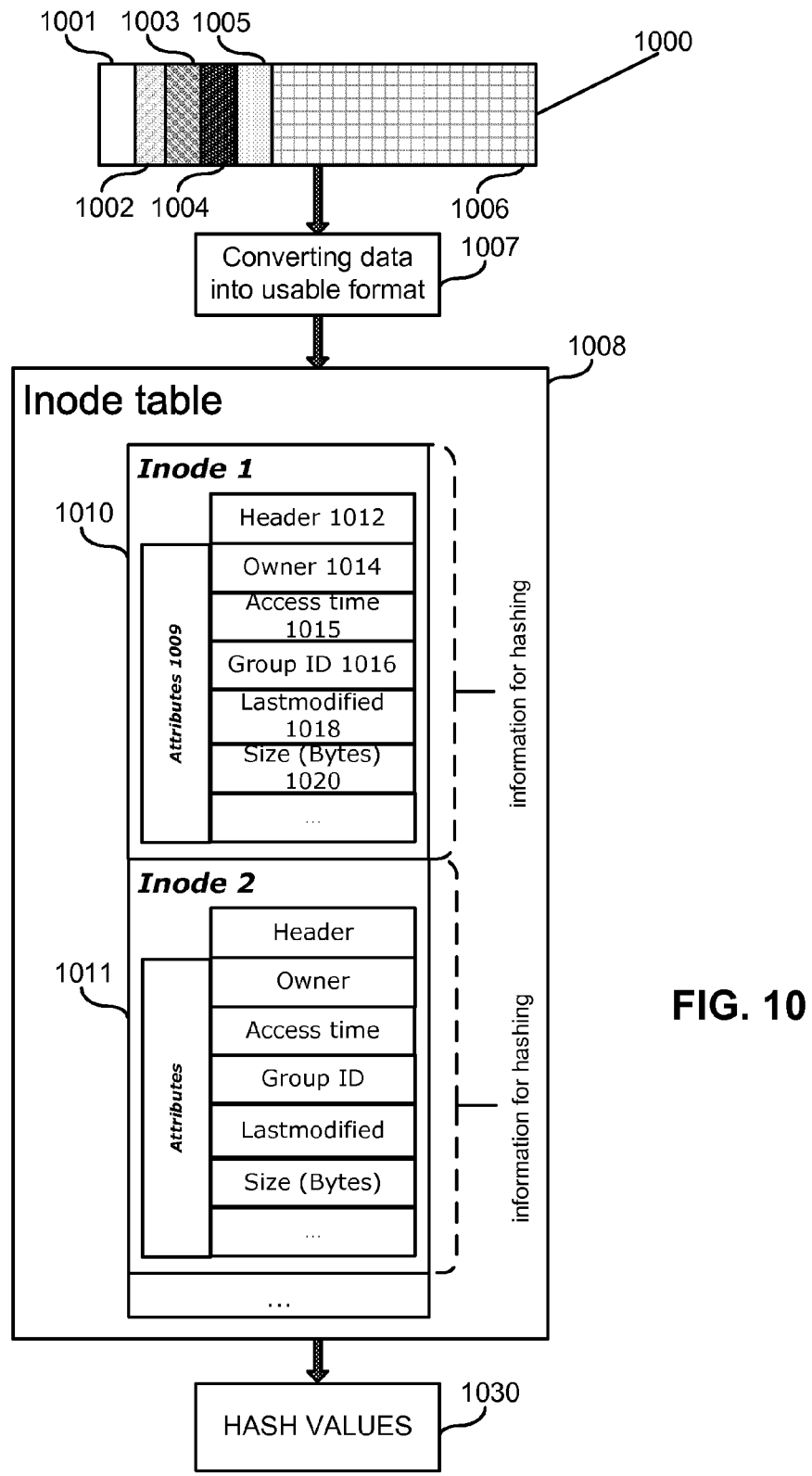
FIG. 10 illustrates a process of hashing the descriptors from a data storage device with Ext2/Ext3 file system.

FIG. 10 illustrates a process of hashing the descriptors from the data storage device with Ext2/Ext3 file system. The disk storage with Ext2/Ext3 file system 1000 includes the super-block 1001, group descriptors 1002, block bitmap 1003, inode bitmap 1004, inode table 1005 and data 1006.

The disk storage with Ext2/Ext3 file system (1000) contains elements necessary for file processing. After starting the process of reading pointed record from the disk, it is necessary to read the disk area with inode table 1008. The inode table is stored on the data storage in its own format. In step 1007 the inode table is converted to the original form 1008.

After an inode table has been presented in the original form the data access attributes are discarded. The inode table consists of inodes 1010, 1011 etc., corresponding to files on the disk storage. The inode consists of header 1012 and attributes 1009. The attributes consist of owner 1014, access time 1015, group ID 1016, last modified 1018, size 1020, etc. Inode entries (without discarded attributes), numbers of indirect blocks, numbers of double indirect blocks and numbers of triple indirect blocks are converted to hash values 1030 after the data access attributes are discarded.

Figure 11:
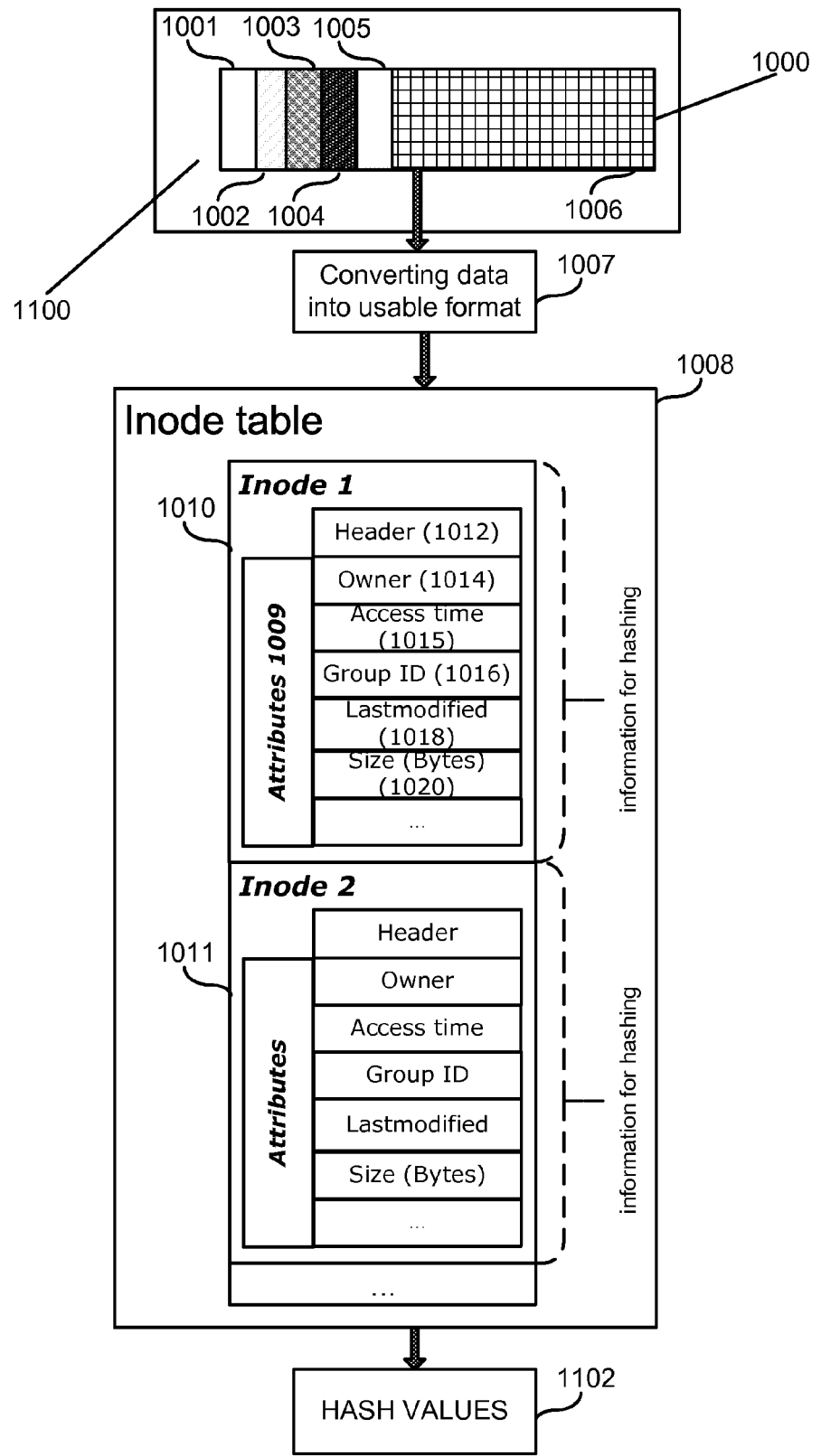
FIG. 11 illustrates a process of hashing the descriptors from the backup of a data storage device with Ext2/Ext3 file system.

FIG. 11 illustrates a process of hashing the descriptors from the backup of the data storage device with Ext2/Ext3 file system. In case of reading descriptors from the backup 1100, the previously stored data from the disk storage with Ext2/Ext3 file system 1000 is included in the backup. The stored disk area can be read through from the backup in Ext2/Ext3 file system structure.

After hash values 1102 are acquired, the procedure for comparing descriptors or portions of descriptors, implemented by calculating hash values for the descriptors or parts of the descriptors, can be started.

Note that, in this embodiment, hashed or non-hashed file or directory attributes can be stored in an incremental backup for further comparison with hashed or non-hashed data access attributes after the next backing up process, or the attributes can be deleted after bitmap creation or update. The stored file or directory attributes (hashed or non-hashed) reflecting the file or the directory changes or displacements are necessary for the backup creation and restoration of data.

Having thus described the different embodiments of a system and method, it should be apparent to those skilled in the art that certain advantages of the described method and apparatus have been achieved. In particular, it should be appreciated by those skilled in the art that the incremental backup method and system described in one of the embodiments significantly reduces the computational burden and associated costs, while increases the overall efficiency of the backup process.

It should also be appreciated that various modifications, adaptations, and alternative embodiments thereof may be made within the scope and spirit of the present invention. The invention is further defined by the following claims.

What is claimed is:

1. A method for combining file-level and block-level backups for a fast incremental backup of a storage device, the method comprising:

(a) creating a bitmap of blocks of the storage device with all blocks that require backing up being marked in the bitmap;
(b) extracting descriptors of the files and directories from a descriptors area of the storage device;
(c) discarding at least some of the descriptors from a set of descriptors associated with each file and then generating a common hash value of a resulting set of descriptors;
(d) recognizing identical hash values related to a prior backup of the storage device and to a current state of the storage device;
(e) checking coincidence of blocks that form a single file, wherein the descriptors of the files have identical hash values, and, for at least some of the blocks that form the single file, comparing contents of the blocks;
(f) unmarking, in the bitmap, the coincident blocks;
(g) backing up contents of the blocks that are marked in the bitmap; and
(h) storing pointers for coincident blocks, wherein the pointers point to blocks from the prior backup.

2. The method of claim 1, wherein the prior backup is a backup of the storage device at a previous point in time.

3. The method of claim 1, wherein the prior backup is a backup of a different storage device.

4. The method of claim 1, wherein the prior backup includes multiple backups of the storage device.

5. The method of claim 1, wherein the discarding includes resetting selected data access attributes of the descriptors.

6. The method of claim 1, wherein the discarding includes resetting selected attributes of the descriptors.

7. The method of claim 1, wherein the descriptors are MFT entries.

8. The method of claim 1, wherein the descriptors are inodes entries.

9. The method of claim 1, wherein the descriptors are directory entries and numbers of all clusters, according to which the directory entries are ordered.

10. The method of claim 1, wherein step (c) further comprises generating hash values for blocks and comparing the hash values of the blocks of the storage device with the hash values of previously archived blocks, that have the same addresses.

11. The method of claim 1, wherein step (e) further comprises bit-wise comparison of the content of the blocks.

12. The method of claim 1, wherein step (b) further comprises reading the descriptors from a disk area of the data storage device.

13. The method of claim 1, further comprising elimination of information unnecessary for the descriptors comparison from the descriptors area.

14. The method of claim 1, wherein the descriptors include data access attributes of any of "Update sequence" in MFT file record header and time read in "$STANDARD_INFORMATION" from attributes of MFT file record.

15. The method of claim 1, wherein MFT contents from a start of a file record to an end marker are converted into hash values.

16. The method of claim 1, wherein the descriptors include data access attribute "last access date" in operating systems with FAT file system.

17. The method of claim 1, wherein the descriptors include data access attribute "access time" in operating system with Ext2/Ext3 file system.

18. The method of claim 1, wherein inodes contents, indirect blocks, double indirect blocks and triple indirect blocks with file data are converted into hash values.

19. A method for combining file-level and block-level backups for a fast incremental backup, the method comprising:
(a) creating a bitmap of blocks of a first storage device with all blocks that require backing up being marked in the bitmap;
(b) extracting descriptors of the files and directories corresponding to blocks of the first storage device and a second storage device;
(c) generating a common hash value of the descriptors;
(d) recognizing identical hash values related to a backup of the second storage device and to a current state of the first storage device;
(e) checking coincidence of blocks that form a single file, wherein the descriptors have identical hash values, and, for at least some of the blocks that form the single file, comparing contents of the blocks;
(f) unmarking, in the bitmap, the coincident blocks;
(g) backing up contents of the units blocks that are marked in the bitmap; and
(h) storing pointers for coincident blocks, wherein the pointers point to blocks from the backup of the second storage device.

20. The method of claim 19, further comprising discarding at least some of the descriptors prior to the generating step.

21. A system for combining file-level and block-level backups for a fast incremental backup of a storage device, the system comprising:
(a) a bitmap of blocks of the storage device with all blocks that require backing up being marked in the bitmap;
(b) a plurality of descriptors of the files and directories stored in a descriptors area of the storage device;
(c) wherein at least some of the descriptors from a set of descriptors associated with each file are discarded and then a common hash value of a resulting set of descriptors is generated;
(d) a set of identical hash values related to a prior backup of the storage device and to a current state of the storage device;
(e) means for checking coincidence of blocks that form a single file, wherein the descriptors have identical hash values, and, for at least some of the blocks that form the single file, comparing contents of the blocks;
(f) wherein, in the bitmap, the coincident blocks are unmarked;
(g) a backup of contents of the blocks that are marked in the bitmap; and
(h) a plurality of pointers for coincident blocks, wherein the pointers point to blocks from the prior backup.

22. The system of claim 21, wherein the discarding comprises resetting selected data access attributes of the descriptors.

23. The system of claim 21, wherein the discarding includes resetting selected attributes of the descriptors.

24. The system of claim 21, wherein the common hash value comprises hash values for blocks and comparing the hash values of the blocks of the storage device with the hash values of previously archived blocks, that have the same addresses.

25. The system of claim 21, wherein the descriptors include data access attributes, including any of the "Update sequence" in MFT file record header and time read in "$STANDARD_INFORMATION" from attributes of MFT file record.

26. The system of claim 21, wherein MFT contents from a start of a file record to an end marker are converted into hash values.

27. The system of claim 21, wherein inodes contents, indirect blocks, double indirect blocks and triple indirect blocks with file data are converted into hash values.

28. A system for combining file-level and block-level backups for a fast incremental backup, comprising:
- a main storage that includes blocks and files;
- a bitmap of the blocks with all blocks that require backing up being marked in the bitmap;
- a block-based archive of a previous state of the main storage; and
- a plurality of descriptors of the files,
- wherein for those files whose control sum values of the descriptors are not identical to control sum values of the descriptors of the previously archived files, an incremental block-based backup of corresponding blocks is performed, wherein for at least some of the blocks that form the single file, contents of the blocks are compared to determine if these blocks need to be backed up and unmarking, in the bitmap, coincident blocks that correspond to the archived logical storage units with coincident descriptors and backing up contents of the blocks that are marked in the bitmap.

29. The method of claim 1, wherein, for those files that contain additional blocks, the bitmap only resets those bits that correspond to the additional blocks.

30. The method of claim 1, wherein, for those files that contain additional metadata, but no new contents, the bitmap only resets those bits that correspond to the new metadata.

31. The method of claim 1, further comprising, for those blocks whose hashes are not identical, comparing the blocks on a cluster by cluster basis, a cluster being a group of blocks.

* * * * *